Figure 1:
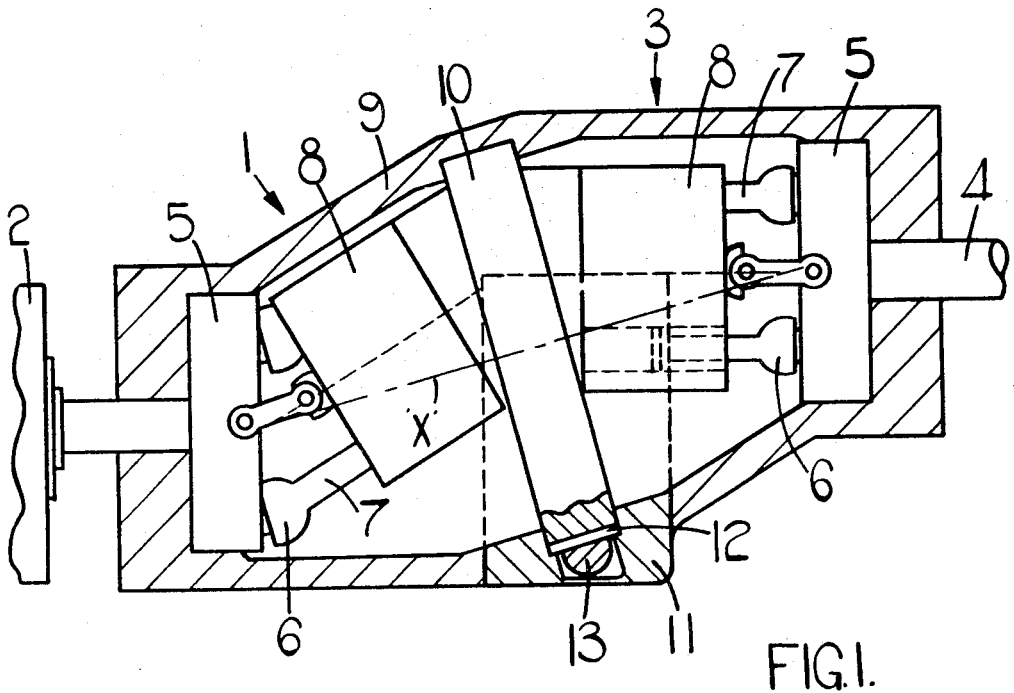

United States Patent

[11] 3,603,086

[72] Inventor Richard Joseph Ifield
 Beecroft, Australia
[21] Appl. No. 872,315
[22] Filed Oct. 29, 1969
[45] Patented Sept. 7, 1971
[73] Assignee Joseph Lucas (Industries) Limited
 Bermingham, England

[54] FLUID CONTROL APPARATUS
 5 Claims, 3 Drawing Figs.
[52] U.S. Cl. .................................................. 60/53 R,
 60/53 A, 60/19
[51] Int. Cl. .................................................. F16d 31/02
[50] Field of Search .................................................. 60/53 A, 19

[56] References Cited
UNITED STATES PATENTS
| | | | |
|---|---|---|---|
| 3,132,486 | 5/1964 | Jonkers et al. | 60/53 A |
| 3,204,411 | 9/1965 | Stockton | 60/53 A |
| 3,213,621 | 10/1965 | Swift et al. | 60/53 A |

Primary Examiner—Edgar W. Geoghegan
Attorney—Holman & Stern

ABSTRACT: apparatus for controlling the pressure of the fluid delivered by a pump to a pressure responsive means and having a chamber 45 containing a movable member, flow of fluid from one side of the member to the other being through passage means and the outlet pressure being determined by the position of the member in the chamber to control the escape of fluid through an outlet and the pressure drop created by the restrictor being determined by changes in a parameter such as the position of a valve connected to a throttle lever for an associated prime mover for a transmission system in which the apparatus is used.

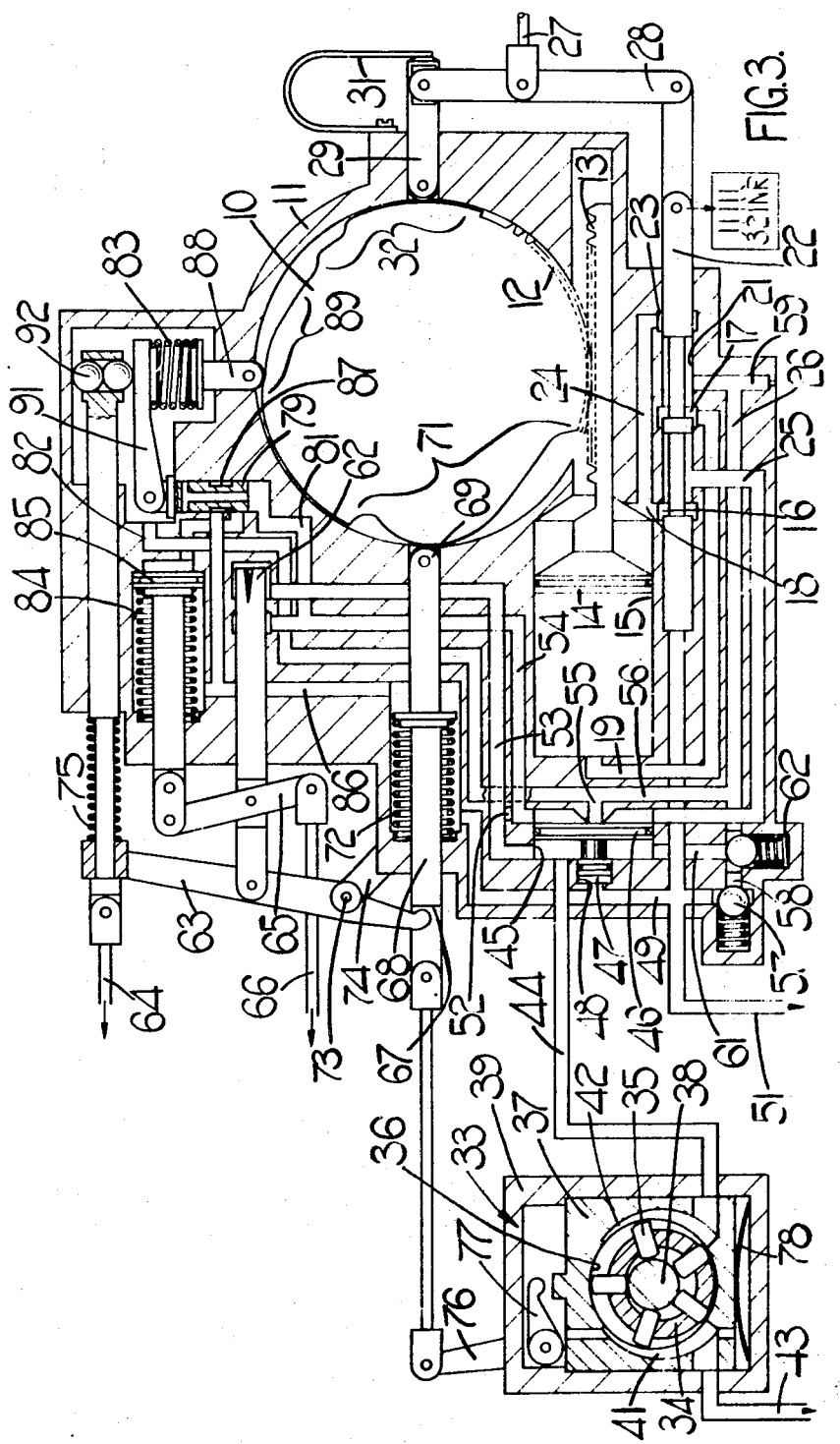

FLUID CONTROL APPARATUS

This invention relates to fluid control apparatus intended to control the pressure of the fluid delivered by a positive displacement pump to a pressure responsive means to be controlled, the apparatus including means whereby fluid flow from the pump which cannot be accepted by the pressure responsive means can escape, and being itself responsive to changes in at least one parameter. Such apparatus will be described as being of the kind specified.

The primary object of the invention is to provide apparatus of the kind specified in a convenient form.

In accordance with the present invention, apparatus of the kind specified comprises a member, passage means whereby fluid from the pump can reach one side of the member, a restricted passage affording communication between one side of the member and the other, the pressure at said other side being controlled by the rate of escape of fluid therefrom which is, in turn, controlled by the position of said member, and a further passage also affording communication between said one side and said other side of the member, said further passage including a restrictor, the pressure drop created thereby being by means responsive to changes in a predetermined parameter, the arrangement being such that the pressure at said other side of the member is applied, in use, to the pressure responsive means.

The apparatus is suitable for use in controlling the supply of motive fluid to a servo device for varying the strokes of the pistons of a pump and motor of an hydraulic automatic transmission system, but it is to be understood that it may be adapted for use in other mechanisms.

A further aspect of the invention relates to an hydraulic control system for a transmission system comprising an hydraulic piston-type pump and an hydraulic piston-type motor having a common ported member having ports through which fluid flows between the pump and the motor, the ported member being movable angularly to vary the strokes of the pistons of the pump and motor. Such a transmission system will be referred to as being of the kind specified.

The object of this invention is to provide a control system for such a transmission system in which, in a convenient manner, movement of the ported member affects variation of the piston strokes of the pump and motor, and thus varies the speed ratio between input and output members of the transmission.

In accordance with this aspect of the invention, an hydraulic control system for a transmission system of the kind specified comprises a positive displacement-type auxiliary pump arranged to be driven by a prime mover which drives the transmission system, a piston and cylinder-type servo device arranged to move the ported member to vary the piston strokes of the pump and motor respectively, a control valve for controlling the supply of fluid to the servo device from the auxiliary pump and for controlling the escape of fluid from the servo device and apparatus for varying the pressure of the fluid delivered by the auxiliary pump through the control valve to the servo device, said apparatus comprising a member, passage means whereby fluid from the auxiliary pump can reach one side of the member, a restricted passage affording communication between one side of the member and the other, the pressure existing at said other side being controlled by the rate of escape of fluid therefrom, which is, in turn, controlled by the position of said member, and a further passage also affording communication between said one side and said other side of the member, said further passage including a restrictor, the pressure drop created thereby being controlled by means responsive to changes in the position of a throttle control for the prime mover, the pressure in said other side being applied to the servo device through the control valve, and the arrangement being such that increasing pressure from the auxiliary pump causes the pressure at the servo device to be increased to tend to cause the ported member of the transmission system to be moved in a direction to increase the speed ratio of the transmission system.

Figure 2:
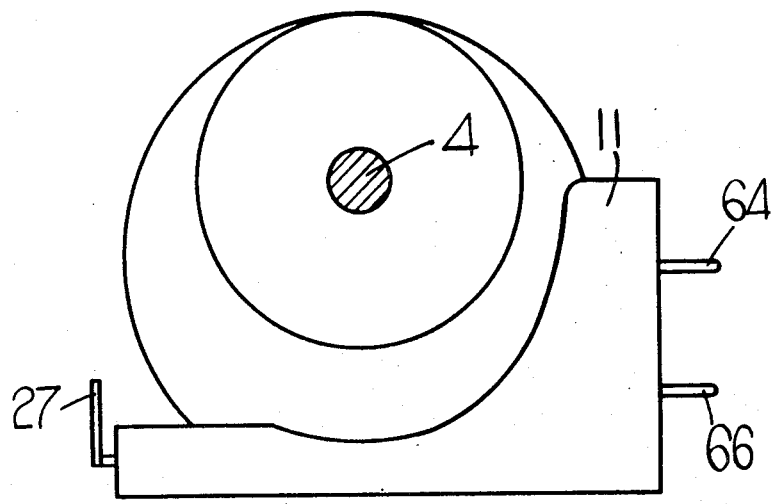

The invention will now be described by way of example with reference to the accompanying drawings in which:

FIG. 1 is a diagrammatic cross-sectional side elevation view of an automatic hydraulic transmission system incorporating the invention, FIG. 2 is an end elevation view of the transmission system, and FIG. 3 shows diagrammatically a control system in accordance with the invention for the transmission system.

This example of a control system is for a transmission system of the kind described and claimed in the complete specification of our copending British Pat. application No. 4412/68. This transmission system, as shown in Figures 1 and 2, comprises an hydraulic pump 1 arranged to be driven by a prime mover 2, and an hydraulic motor 3 arranged to drive an output shaft 4, the motor receiving motive fluid from the pump 1. Both the pump 1 and the motor 3 are of the kind comprising a rotatable member 5 carrying, through a plurality of universal joints 6, a plurality of angularly spaced pistons 7 engaging the bores in a rotor 8. The end of the rotor 8 remote from the rotatable member engages a ported member 10 whereby fluid can enter and leave the bores containing the pistons 7. The ported member 10 is common to the pump and motor and is mounted in a composite casing 11 of the transmission system.

The ported member 10 has respective oppositely directed faces which engage the pump and motor rotors 8 respectively, and the arrangement is such that angular movement of the ported member 10 about a fixed axis causes the inclinations of the rotors 8 of the pump and motor to change with respect to the axes of the input and output shafts of the transmission system, thus varying the strokes of the pistons of the pump and motor respectively, and so to vary the speed ratio between the input and output shafts.

The transmission system has a casing 11 and the ported member 10 is mounted in the casing in bearings (not shown) about an axis 'x' which is fixed relatively to the casing 11 The ported member 10 has a gear quadrant 12 formed on its periphery engaging with a rack 13. The control system is arranged to move the rack 13 in order to cause angular movement of the ported member 10.

To accomplish control of the rack 13, this is connected to a piston 14 of a piston and cylinder-type servo device, shown in FIG. 3. The cylinder 15 of this device has its opposite ends connected to respective galleries 16, 17 in a bore 21 in the casing 11 through respective passages 18, 19.

In the bore 21 is slidably mounted a spool 22 having three spaced lands. The bore 21 also has a further gallery 23 communicating with the passage 18 through a further passage 24. The zones of the bore 21 between the galleries 17. 18 and 17. 23 communicate with passages 25, 26 respectively These zones of the bore always correspond with the zones of the spool 22 intermediate the lands thereof respectively The servo device is so arranged that when fluid under pressure is admitted through the passage 18 to the cylinder 15, the pinion 14 moves to move the ported member in a direction (clockwise as shown) to increase the speed ratio of the transmission when forward travel thereof is selected. If fluid is admitted to the other end of the cylinder, the speed ratio is reduced towards a neutral position. The continued angular movement of the ported member 10 in the anticlockwise direction beyond the neutral position causes increase in the speed ratio when reverse has been selected. The ported member is illustrated in neutral position The spool 22 is connected to a manual control 27 through a lever 28. One end of this lever 28 is connected to the spool 22 and the other is connected to a cam follower 29 the manual control 27 being connected to the midregion of the lever 28 A spring 31 urges the cam follower 29 into engagement with a first cam surface 32 formed on the periphery of the ported member 10, this cam surface 32 being formed in three steps at differing radial distances from the axis of rotation of the member 10. In an alternative construction, the cam surface 32 and the other cam surfaces later to be referred to, are formed on a separate part fixed to the ported member 10 and arranged to move with it.

The manual control 27 is actuated to determine the position of the spool 22. If it is desired to select forward travel, but also to limit the maximum speed ratio which can be attained, the spool 22 is set to the position shown marked 1, or to an alternative intermediate speed ratio hold position marked 2. In the position shown, the pressure of fluid in the passage 25 exceeding that in the passage 26, there will be high pressure fluid admitted to the cylinder 15 through the gallery 16 and passage 18. This causes movement of the piston 14 to the left from the position shown in FIG. 3, and consequent angular movement of the ported member in a clockwise direction.

When the cam follower 29 reaches the first step in the cam surface 32, it moves radially inwardly thus causing the spool 22 to move in a direction to permit the galleries 17 and 23 to communicate through the passage 24. This allows the pressures at the opposite sides of the piston 14 to equalize since the galleries 23 and 17 also communicate through the bore 21 so that the piston 14 comes to rest. The effect of this is therefore to limit the permitted maximum angular movement of the ported member 10 in a clockwise direction.

When the spool 22 is set manually to occupy the position 2, the angular movement of the ported member 10 is arrested upon engagement of the cam follower 29 with the second step in the cam surface 32.

When in the position marked 3, no limit is set upon angular movement of the ported member 10 by control of the spool 22, the limit of such movement being determined by the maximum possible travel of the piston 14 of the servo device in the clockwise direction.

To provide a supply of fluid under pressure to the servo device, the system includes an auxiliary pump 33 which is arranged to be driven by the prime mover which also drives the transmission system. The pump 33 is of the vane type and has a rotor 34 slotted to engage vanes 35, the outer ends of which engage an internal cam surface 36, normally eccentric with respect to the axis of rotation of the rotor 34, formed on a member 37. Concentric with this surface 36 is a part 38 with which the inner ends of the vanes 35 engage.

The member 37 is slidably mounted in a body 39 of the pump, sliding movement of the member 37, together with the part 38 serving to vary the eccentricity of the surface 36 with respect to the axis of rotation of the rotor 34.

The member 37 has an inlet slot 41 and an outlet slot 42 for fluid to be pumped communicating respectively with an inlet passage 43 from a reservoir (not shown) and with an outlet passage 44.

The outlet passage 44 enters one end of a cylinder 45 in the body 11, in which the servo device is disposed. The cylinder 45 contains a piston 46 connected to a smaller diameter coaxial piston 47 in a similarly proportioned cylinder 48 opening into the cylinder 45. Thus oppositely presented surfaces of the pistons 46 and 47 respectively are subjected to the pressure in the outlet passage 44 from the auxiliary pump 33.

The end of the cylinder 48 at the opposite side of the piston 47 communicates through a passage 49, with a passage 51 leading to the reservoir of the system.

The opposite ends of the cylinder 45 are in communication with one another through a restricted orifice 52 disposed between two passages 53, 54 communicating with the ends of the cylinder 45 respectively. The end of the cylinder 45 remote from that at which the outlet passage 44 from the auxiliary pump 33 enters, has an outlet passage which is the passage 25 communicating with the bore 21 containing the spool 22. This is the passage through which fluid at relatively high pressure reaches the servo device.

The same end of the cylinder 45, however, has a further outlet 55 which is controlled by the position of the piston 46. This outlet 55 communicates with a passage 56 which, in turn communicates with the passage 51 to the reservoir through a pressure relief valve 57 in a passage 58. This valve 57 maintains, in the passages 26, 56 and 58, a minimum pressure which, however, is always substantially lower than that in the passage 25. A further passage 59 communicating with the passage 26 leads to a lubrication circuit of the transmission system.

The cylinder 45 has still further outlet passage 61 at the same end as the passage 44 from the auxiliary pump 33, this passage 61 including a high pressure relief valve 62 permitting escape of fluid into the passage 58 in the event of excess pressure in the cylinder 45.

In use, the delivery pressure from the pump 33 is related to speed of the prime mover. The position of the piston 46 is dependent upon the pressure drop created by the restricted orifice 52. The position of the piston 46 determines the escape through the outlet 55 and thus determines the pressure existing in the passage 25 available to control the servo device. The differential areas of the pistons 46, 47 provides amplification of the effect of the pressure drop, changes across the orifice 52.

The pressure differential between the passages 53 and 54 is not only determined by the orifice 52 but also by a valve 62 This valve 62 is connected through a link 63 to a manual control 64, which is also connected to the throttle of the prime mover, which is an internal combustion engine, through a secondary link 65 and a rod 66.

The movement of the lever 63 is limited by engagement at one end, remote from the control 64, in a slot 67 in a rod 68 The rod terminates in a cam follower 69 engaging a second cam surface 71 formed on the ported member 10 at a position angularly spaced from the first surface 32. A spring 72 urges the cam follower into engagement with the surface 71 When in the position illustrated, that is neutral, the surface 71 formed on the ported member 10 provides for very small travel of the lever 63 about an axis 73 on a fixed bracket 74. However, the larger the angular movement of the member 10 in either direction away from this neutral position, the larger the permitted travel of the lever 63 and the further opening of the throttle is permitted.

The connection between the lever 63 and the manual control 64 includes a spring 75 whereby lost motion of the control 64 can be accommodated.

The rod 68 also extends away from the cam follower end 69 to connect with a lever 76 on the auxiliary pump body 39 This is capable of engaging through an arm 77 with an end of the member 37 of the auxiliary pump for the purpose of adjusting its position and thus the output from the pump. Some motion of the lever 76 can, however, be accommodated without any adjustment of the member 37 at small angular displacements of the ported member 10 from the neutral position. This arrangement provides for reduction in the flow from the auxiliary pump 33 with increasing speed of the prime mover A spring 78 tends to urge the member 37 of the pump towards its maximum eccentric position in which maximum flow occurs. Reduction in the flow from the auxiliary pump 33 does not affect the relation of its output pressure to the prime mover speed.

The control system also provides a variation in the pressure in the passage 25 to the servo device in accordance with torque transmitted by the transmission system, but it is arranged that no torque will be transmitted if the throttle is closed and thus when the engine is idling.

This is achieved through a valve 79 which can permit the escape of fluid through the interior, past the orifice 52 and the valve 62 by connecting together a passage 81, which is itself connected to the passage 54, and a passage 82 which communicates with the reservoir through the passages 56, 58 and 51 Movement of the valve 79 to permit this is achieved if the pressure in the passage 54 is sufficient to overcome the force applied to it by a spring 83.

Simultaneously with escape of fluid through the valve 79 the fluid at the pressure in the passages 54 and 81 reaches one end of a cylinder 84 containing a spring-loaded piston 85 The other end of the cylinder 84 is open to the reservoir through a passage 86 and the passages 49 and 51. The piston 85 is connected to the secondary link 65 of the throttle linkage and acts on it in a direction tending to close the throttle of the engine When the valve 79 is closed to prevent flow past the orifice 52 and valve 62, both ends of the cylinder 84 are open to the passage 86 through a groove 87 in the valve 79.

Torque transmitted by the transmission is reflected in a tendency for the ported member 10 to move towards its neutral position and this affects the force applied by the spring 83 on the valve 79, since this spring 83 has, for an abutment, a cam follower 88 acting upon a third cam surface 89 on the ported member. The nearer the ported member 10 moves towards the neutral position, the greater is the force applied by the spring 83 to the valve 79, but this force is further increased when the mechanism is in reverse. The spring 83 acts on the valve 79 through an arm 91 which, however, is also provided with a sliding abutment 92 connected to the manual control 75 for the engine throttle. When the throttle control 75 is in the throttle closed position, the spring 83 has no affect upon the valve 79, but the further this control is moved, the greater is the force of the spring 83 upon the valve 79 tending to close it.

In an alternative arrangement the cam surfaces are formed on one or more surfaces of the rack 13, instead of on the ported member 10.

Having thus described my invention what I claim as new and desire to secure by Letters Patent is:

1. Apparatus of the kind specified comprising a member, passage means whereby fluid from a positive displacement pump can reach one side of the member, a restricted passage affording communication between one side of the member and the other, the pressure at said other side being controlled by the rate of escape of fluid therefrom which is, in turn, controlled by the position of said member, and a further passage also affording communication between said one side and said other side of the member, said further passage including a restrictor, the pressure drop created thereby being variable by means responsive to changes in a predetermined parameter, the arrangement being such that the pressure at said other side of the member is applied, in use, to the pressure responsive means.

2. Apparatus as claimed in claim 1 in which the member is a piston in a cylinder and the member serves as a closure for controlling escape of fluid from the cylinder in accordance with the position of the piston in the cylinder.

3. Apparatus as claimed in claim 2 in which the piston has fixed to it a further coaxial smaller piston disposed in a coaxial smaller cylinder, the fluid pressure at said one side of the larger piston also being applied to the smaller piston to oppose the action of such pressure on the larger piston.

4. Apparatus as claimed in claim 1 in which the restrictor is of fixed size and the passage means in which it is located contains a valve which is arranged to modify the fluid pressure drop created by the restrictor, the valve being controlled in response to changes in said parameter.

5. A transmission system of the kind specified having a hydraulic pump arranged to supply fluid under pressure to a hydraulic motor, comprising a positive displacement type auxiliary pump arranged to be driven by a prime mover which drives the transmission system, a piston and cylinder-type servo device arranged to move a ported member to vary piston strokes of the pump and the motor respectively, a control valve for controlling the supply of fluid to the servo device from the auxiliary pump and for controlling the escape of fluid from the servo device and apparatus for varying the pressure of the fluid delivered by the auxiliary pump through the control valve to the servo device, said apparatus comprising a member, passage means whereby fluid from the auxiliary pump can reach one side of the member, a restricted passage affording communication between one side of the member and the other, the pressure existing at said other side being controlled by the rate of escape of fluid therefrom, which is, in turn, controlled by the position of said member, and a further passage also affording communication between said one side and said other side of the member, said further passage including a restrictor, the pressure drop created thereby being controlled by means responsive to changes in the position of a throttle control for the prime mover, the pressure in said other side being applied to the servo device through the control valve, and the arrangement being such that increasing pressure from the auxiliary pump causes the pressure at the servo device to be increased to tend to cause the ported member of the transmission system to be moved in a direction to increase the speed ratio of the transmission system.